(12) United States Patent
Duprez

(10) Patent No.: US 11,921,031 B2
(45) Date of Patent: Mar. 5, 2024

(54) COMPACT GAS SENSOR

(71) Applicant: ELICHENS, Grenoble (FR)

(72) Inventor: Hélène Duprez, Seyssinet-Pariset (FR)

(73) Assignee: ELICHENS, Grenoble (FR)

( * ) Notice: Subject to any disclaimer, the term of this patent is extended or adjusted under 35 U.S.C. 154(b) by 223 days.

(21) Appl. No.: 17/594,630

(22) PCT Filed: Apr. 22, 2020

(86) PCT No.: PCT/EP2020/061257
§ 371 (c)(1),
(2) Date: Oct. 25, 2021

(87) PCT Pub. No.: WO2020/216809
PCT Pub. Date: Oct. 29, 2020

(65) Prior Publication Data
US 2022/0214267 A1 Jul. 7, 2022

(30) Foreign Application Priority Data
Apr. 25, 2019 (FR) ...................... 1904355

(51) Int. Cl.
G01N 21/03 (2006.01)
G01N 21/3504 (2014.01)

(52) U.S. Cl.
CPC ....... *G01N 21/031* (2013.01); *G01N 21/3504* (2013.01); *G01N 2201/066* (2013.01)

(58) Field of Classification Search
CPC ............. G01N 21/031; G01N 21/3504; G01N 2201/066
USPC ..................................................... 356/437
See application file for complete search history.

(56) References Cited

U.S. PATENT DOCUMENTS

| 5,026,992 | A | 6/1991 | Wong |
| 2006/0226367 | A1 | 10/2006 | Hopkins et al. |
| 2015/0219491 | A1 | 8/2015 | Lee et al. |

FOREIGN PATENT DOCUMENTS

| EP | 2711687 A1 | 3/2014 |
| EP | 2891876 A1 | 7/2015 |
| EP | 3208601 A1 | 8/2017 |
| FR | 3022999 A1 | 1/2016 |
| FR | 3057363 A1 | 4/2018 |
| WO | 2007/064370 A2 | 6/2007 |

(Continued)

OTHER PUBLICATIONS

International Search Report for International Application No. PCT/EP2020/061257, dated Oct. 16, 2020, 6 pages with English translation.

(Continued)

Primary Examiner — Md M Rahman
(74) Attorney, Agent, or Firm — TraskBritt

(57) ABSTRACT

A gas sensor comprises an enclosure configured to receive a gas. The enclosure comprises a sidewall extending, around a transverse axis, between a first wall and a second wall. The sensor also comprises a light source configured to emit a light wave that propagates in the enclosure and forms, from the light source, a first light cone. A measuring photodetector is configured to detect the light wave emitted by the light source and propagated through the enclosure. The first wall and the second wall each comprise at least one reflective surface, forming a portion of an ellipsoid of revolution. Each reflective surface is associated with a rank n, n being an integer greater than or equal to 1.

14 Claims, 5 Drawing Sheets

(56) References Cited

FOREIGN PATENT DOCUMENTS

WO 2018/162848 A1 9/2018

OTHER PUBLICATIONS

International Written Opinion for International Application No. PCT/EP2020/061257, dated Oct. 16, 2020, 10 pages with English machine translation.

COMPACT GAS SENSOR

CROSS-REFERENCE TO RELATED APPLICATIONS

This application is a national phase entry under 35 U.S.C. § 371 of International Patent Application PCT/EP2020/061257, filed Apr. 22, 2020, designating the United States of America and published as International Patent Publication WO 2020/216809 A1 on Oct. 29, 2020, which claims the benefit under Article 8 of the Patent Cooperation Treaty to French Patent Application Serial No. FR1904355, filed Apr. 25, 2019.

TECHNICAL FIELD

The technical field of the disclosure is an optical gas sensor, and more particularly a nondispersive infrared sensor.

BACKGROUND

It is quite common to use optical methods to analyse a gas. Sensors allow the composition of a gas to be determined based on the fact that the species from which a gas is composed have spectral absorption properties that are different from one another. Thus, if an absorption spectral band of a gaseous species is known, the concentration of the latter may be determined via an estimation of the absorption of the light passing through the gas, using the Beer-Lambert law. This principle allows the concentration of a gaseous species present in the medium to be estimated.

The light source is usually a source emitting in the infrared, the method used usually being designated NDIR detection, NDIR being the acronym of nondispersive infrared. Such a principle has been frequently implemented, and is described, for example, in many documents, for example, in U.S. Pat. No. 5,026,992 or WO2007064370.

In the most common methods, the analysed gas lies between a light source and a photodetector, referred to as the measuring photodetector, the latter being intended to measure a light wave emitted by the source and transmitted through the gas to be analysed and partially absorbed by the latter. These methods generally comprise a measurement of a light wave, called the reference light wave, emitted by the source, and not absorbed by the analysed gas.

Comparing the light wave in the presence of gas and the light wave without gas allows the gas to be characterized. It is, for example, a question of determining an amount of a gaseous species in the gas, in the case of the technology referred to as "absorption-based NDIR." It may also be a question of estimating a number of particles in the gas, by detecting light scattered by the latter in a predetermined angular range of scatter.

The reference light wave is measured by a reference photodetector. It may be a question of a reference photodetector different from the measuring photodetector, and arranged so as to be placed facing the light source, the reference photodetector being associated with a reference optical filter. The reference optical filter defines a reference spectral band, in which the gas to be analysed exhibits no significant absorption.

Documents EP2711687 and EP2891876 describe gas sensors comprising enclosures, in which one or more mirrors are arranged. The mirrors allow the path length of the light through the enclosure to be maximized, and light rays that have passed through the gas to be focused on the one or more photodetectors. This allows detection sensitivity to be increased while using compact devices.

Document EP3208601 describes a compact gas sensor, formed from reflective walls the profile of which is elliptical. The same goes for the document WO2018162848.

The applicant has designed a particularly compact gas sensor that is compatible with a current industrial format. A gas sensor of optimized performance and that notably favours compactness and sensitivity results.

BRIEF SUMMARY

A first subject of the disclosure is a gas sensor comprising an enclosure able to receive a gas, the enclosure comprising a sidewall that extends, about a transverse axis, between a first wall and a second wall, the sensor also comprising:
  a light source configured to emit a light wave that propagates through the enclosure and forms, from the light source, a first cone of light; and
  a measuring photodetector able to detect a light wave emitted by the light source and propagating through the enclosure;
the sensor being such that the first wall and the second wall each comprise at least one reflective surface, forming a portion of an ellipsoid of revolution, with each reflective surface being associated a rank n, n being an integer higher than or equal to 1, such that the sensor comprises:
  a first reflective surface of rank 1 having a first focal point and a second focal point, the first reflective surface being placed facing the light source;
  at least one reflective surface of rank n strictly higher than 1, each reflective surface of rank n having:
    a first focal point, coincident with the second focal point of a reflective surface of preceding rank n−1; and
    a second point, distinct from the first focal point, and coincident with the first focal point of a reflective surface of following rank n+1; and
  a last reflective surface of rank N, comprising a first focal point coincident with the second focal point of a reflective surface of preceding rank, the last reflective surface also comprising a second focal point;
such that the light wave emitted by the light source is successively reflected by the N ellipsoidal-of-revolution reflective surfaces, according to their respective rank, before converging towards the second focal point of the last reflective surface in such a way as to form a last cone of light, the measuring photodetector being placed so as to lie in the last cone of light:

The ellipsoidal first reflective surface is associated with a first ellipse. The eccentricity of the first ellipse is preferably lower than 0.8, or even 0.7, or even than 0.5.

The light source is preferably placed at the first focal point of the first reflective surface, or at a distance smaller than 1 mm from the latter. The measuring photodetector is preferably placed at the second focal point of the last reflective surface, or at a distance smaller than 1 mm from the latter.

Advantageously:
  each reflective surface of rank n is configured to reflect the light wave that it receives in such a way as to form a cone of light of rank n+1, the latter extending about a propagation axis of rank n+1;
  when n<N, the propagation axis of rank n+1 extends from the surface of rank n to the surface of rank n+1 and through the second focal point of the surface of rank n, the latter being coincident with the first focal point of the surface of rank n+1; and when n=N, the propagation axis of rank N+1 extends from the surface of rank N to the measuring photodetector;

in such a way that the light wave emitted by the light source undergoes a number of reflections corresponding to the number of reflective surfaces before reaching the measuring photodetector, in the form of a last cone of light.

When n<N, each cone of light of rank n+1 may converge towards the second focal point of the reflective surface of rank it from which it is propagating, then diverge towards the reflective surface of rank n+1 towards which it is propagating.

According to one embodiment, the light source and the measuring photodetector are integral with an internal face of the first wall, the internal face being oriented towards the interior of the enclosure. According to this embodiment, reflective surfaces of even rank are arranged on the internal face of the first wall. Reflective surfaces of uneven rank are arranged on an internal face of the second wall. The enclosure may then be formed by assembling the second wall facing the first wall.

Preferably, the number of reflective surfaces lying between the light source and the measuring photodetector is uneven. The number of reflective surfaces lying between the light source and the measuring photodetector may be equal to five (5).

The sensor may comprise a reference photodetector configured to detect a light wave considered to be not attenuated by the gas. The sensor may then comprise a reference reflective surface, forming an ellipsoid of revolution, the reference surface comprising:
  a first focal point placed at the light source; or at a distance smaller than 1 mm from the latter; and
  a second focal point placed at the measuring photodetector, or at a distance smaller than 1 mm from the latter.

Preferably, the light source, the measuring photodetector and the reference photodetector are coplanar, or substantially coplanar, a tolerance smaller than 1 mm or 2 mm being allowed. They may be arranged on the first wall.

Preferably, each ellipsoidal reflective surface is obtained by rotating an ellipse, with which the surface is associated, about its major axis.

A second subject matter of the disclosure is a method for analysing a gas using a sensor according to the first subject of the disclosure, the method comprising the following steps:
  a) introducing the gas into the enclosure of the sensor;
  b) illuminating the gas using the light source;
  c) measuring, with the measuring photodetector, a light intensity of a light wave emitted by the light source and having propagated through the enclosure; and
  d) determining an amount of a gaseous species in the gas, on the basis of the measured light intensity.

Step d) is generally implemented by a processing unit on the basis of a signal generated by the measuring photodetector.

Step d) may take into an account an intensity that would be measured by the measuring photodetector in the absence of the absorbent species in the enclosure. This intensity may be measured initially or may be estimated using a reference photodetector, the latter measuring an intensity of a reference light wave emitted by the light source and the absorption of which by the gas is considered to be negligible. According to one embodiment, the photodetector measures the reference light wave in a reference spectral band in which the light wave emitted by the light source is considered not to be absorbed.

Embodiments of the disclosure will be better understood on reading the description of the examples of embodiment, which are described, in the rest of the description, with reference to the figures listed below.

DETAILED DESCRIPTION

Figure 1A:
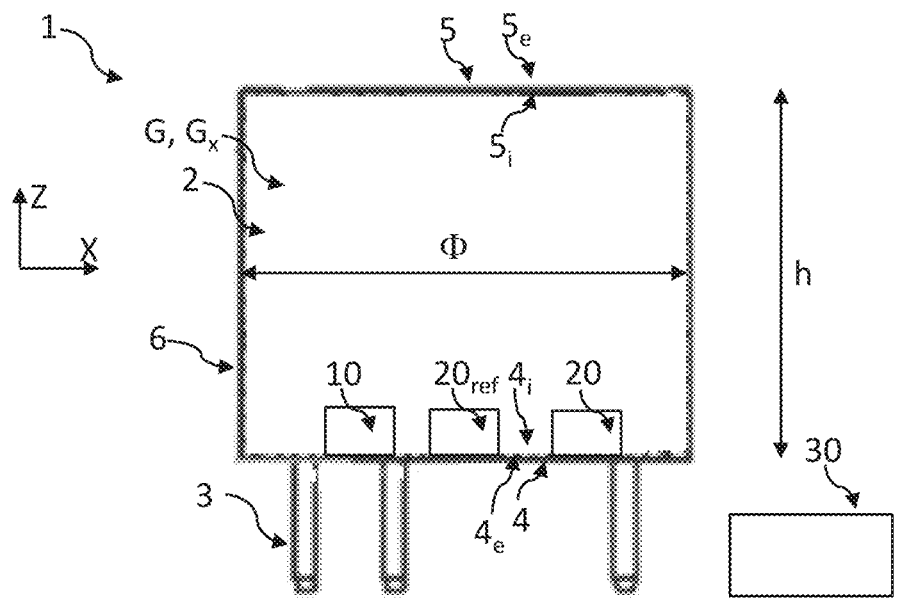
FIGS. 1A and 1B are cross sections of the gas sensor, in a transverse XZ plane and in a main XY plane, respectively, the main plane being perpendicular to the transverse plane.
Figure 1B:
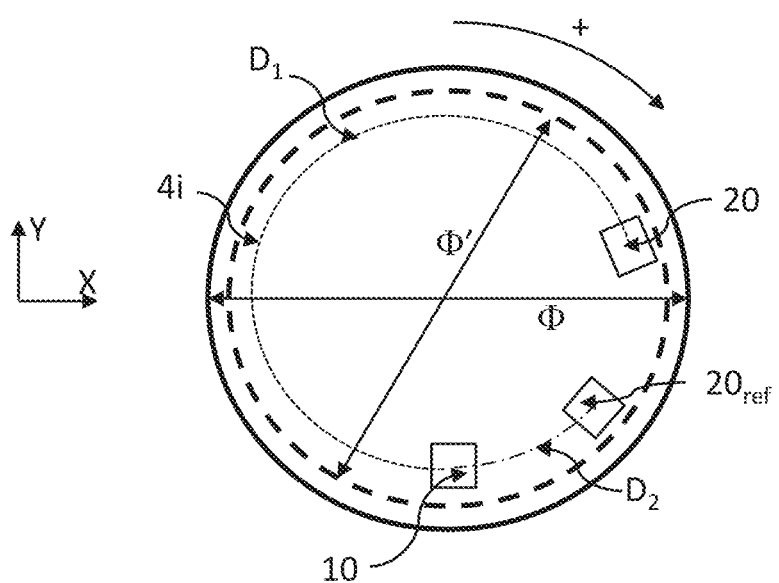

FIGS. 1A and 1B schematically show a gas sensor 1 according to the disclosure. The gas sensor 1 comprises an enclosure 2 bounded by a first wall 4, a second wall 5 and a sidewall 6. The sidewall 6 extends parallel to a transverse axis Z. The sidewall 6 is an annular wall, about the transverse axis Z. It extends between the first wall 4 and the second wall 5. The transverse axis Z extends perpendicular to a main XY plane. The enclosure 2 forms a cylindrical housing.

The first wall 4 comprises an external face $4_e$ and an internal face $4_i$. The second wall 5 comprises an external face $5_e$ and an internal face $5_i$. The respective external faces $4_e$, $5_e$ of the first and second walls 4, 5 are planar and lie parallel to the main XY plane. They are perpendicular to the transverse axis Z about which the annular wall 6 extends. The respective internal faces $4_i$, $5_i$ of the first and second walls 4, 5 are oriented towards the interior of the enclosure 2. The enclosure 2 is connected to connection pins 3, parallel to the transverse axis Z.

The shape and dimensions of the sensor 1 are in accordance with a format that is conventional in the field of gas detection called the 4R format. The diameter Φ of the enclosure 2 is 20 mm, and its height h is 16.6 mm. On account of the thickness of the sidewall 6, the inside diameter Φ' of the enclosure 2 is 17 mm. A positive direction of rotation around the transverse axis Z is defined and is considered arbitrarily to be similar to the direction of rotation of the hands of a clock.

One advantage of the 4R format is this it is widely used in the field of electronics. Thus, a gas sensor 1 that respects this format may easily be connected to existing electronic circuits. Respect of this format facilitates maintenance of measuring systems, by facilitating the replacement of sensors.

However, one difficulty related to this format is its compactness. The useful volume of the enclosure is small, this requiring the optimization approach described below.

The enclosure 2 is intended to be occupied by a gas G to be analysed. The gas to be analysed comprises a gaseous species $G_x$ a concentration $C_x$ of which in the gas it is desired to determine. The gaseous species $G_x$ absorbs light, and notably infrared light, in an absorption spectral band $\Delta\lambda_x$. The sensor 1 also comprises:
- a light source 10 configured to emit a light wave 11 in an emission spectral band $\Delta\lambda$. The emission spectral band may extend between the near ultraviolet and the mid infrared, for example between 200 nm and 20 µm, and most often lies in the infrared, the emission spectral band $\Delta\lambda$ being, for example, comprised between 1 µm and 20 µm.
- a measuring photodetector 20, configured to detect a light wave 14, called the transmitted light wave, in the absorption spectral band $\Delta\lambda_x$. The transmitted light wave is a light wave emitted by the light source 10, and that is propagated through the enclosure, and that is gradually attenuated as it is propagated through the gas. The measuring photodetector 20 may be associated with a bandpass filter, defining a detection spectral band $\Delta\lambda_d$ comprised in the absorption spectral band $\Delta\lambda_x$.
- a reference photodetector $20_{ref}$ configured to detect a reference light wave. The reference light wave detected by the reference photodetector $20_{ref}$ is considered to be not attenuated by the gas G present in the enclosure. In this example, the reference photodetector $20_{ref}$ detects the reference light wave in a reference spectral band $\Delta\lambda_{ref}$, in which the attenuation of the light wave emitted by the source is considered to be negligible. The reference photodetector may be associated with a reference bandpass filter, defining the reference spectral band $\Delta\lambda_{ref}$. For example, the reference spectral band $\Delta\lambda_{ref}$ is centered on the wavelength 3.91 µm. Use of a reference photodetector is optional but advantageous. Alternatively, the reference photodetector is not placed in the enclosure 2 containing the gas, in which case the reference spectral band may be similar to the measurement spectral band.

Preferably, the light source 10, the measuring photodetector 20 and the reference photodetector $20_{ref}$ are joined to the same planar holder. It may notably be a question of a circuit board forming the first wall 4 of the enclosure 2. Such an arrangement simplifies the manufacture of the sensor.

The light source may be pulsed, and emit light pulses the duration of which is generally comprised between 50 ms and 1 s. It may notably be a question of an infrared light source of filament type formed on a suspended membrane, the filament being passed through by an electric current. In this way, the suspended membrane is heated to a temperature comprised between 400° C. and 800° C., so as to emit infrared light.

The measuring photodetector 20 and the reference photodetector $20_{ref}$ may be thermopiles or pyrodetectors or photodiodes. Each photodetector is configured to generate a detection signal, the amplitude A of which corresponds to an intensity I of the detected light wave.

The intensity I of the light wave detected by the measuring photodetector 20 depends on the concentration $C_x$ of the gaseous species of interest $G_x$ according to the Beer-Lambert relationship:

$$att = \frac{I}{I_0} = e^{-\mu(C_x)l} \quad (1)$$

where:
- $\mu(C_x)$ is an attenuation coefficient dependent on the sought-after concentration $C_x$;
- l is the thickness of gas passed through by the light wave in the enclosure; and
- $I_0$ corresponds to the intensity of the wave that is or would be detected by the measuring photodetector 20 in the absence of absorbent gas in the enclosure.

The comparison between I and $I_0$, taking the form of a ratio $I/I_0$, corresponds to an attenuation att caused by the gaseous species $G_x$ in question. During each pulse from the light source 10, it is thus possible to determine $\mu(C_x)$, this allowing the quantity $C_x$ to be estimated given that the relationship between $C_x$ and $\mu(C_x)$ is known.

The intensity $I_0$ may be determined beforehand, for example, during a calibration, or measured in the absence of gas in the enclosure 2. When the sensor comprises a reference photodetector $20_{ref}$, the intensity $I_0$ may be estimated from the reference intensity $I_{ref}$ measured by the reference photodetector. To this end, since the emission spectrum of the light source 10 is known, a function $f$ allowing $I_0$ to be estimated depending on $I_{ref}$ according to expression (2) is used:

$$I_0 = f(I_{ref}) \quad (2)$$

The sensor comprises a processing unit 30, which receives the signals measured by the measuring photodetector 20 and the optional reference photodetector $20_{ref}$. The processing unit 30 allows, on the basis of the signals, the computations for estimating the concentration of the sought-after gaseous species to be performed. The processing unit 30, for example, comprises a microprocessor.

The dimensions of the enclosure 2 in which the gas lies are particularly small. However, it is preferable for the light wave detected by the measuring photodetector 20 to be attenuated enough for the attenuation att to be more easily quantifiable, given the various noises in the measurement chain. It is therefore preferable for the length l travelled by the rays reaching the measuring photodetector to be large enough. The applicant considers that the attenuation att must be higher than 0.2, and, for example, comprised between 0.2 and 0.3.

In order to optimize the length l of the paths travelled by the rays reaching the measuring photodetector, an enclosure 2 comprises reflective surfaces of ellipsoidal shape. Thus, the reflective surfaces follow a portion of an ellipsoid of revolution. The reflective surfaces allow the wave emitted by the light source to be reflected multiple times before reaching the measuring photodetector. An increase in the length l travelled, in the enclosure 2, by the rays reaching the measuring photodetector 20 results.

Figure 2A:
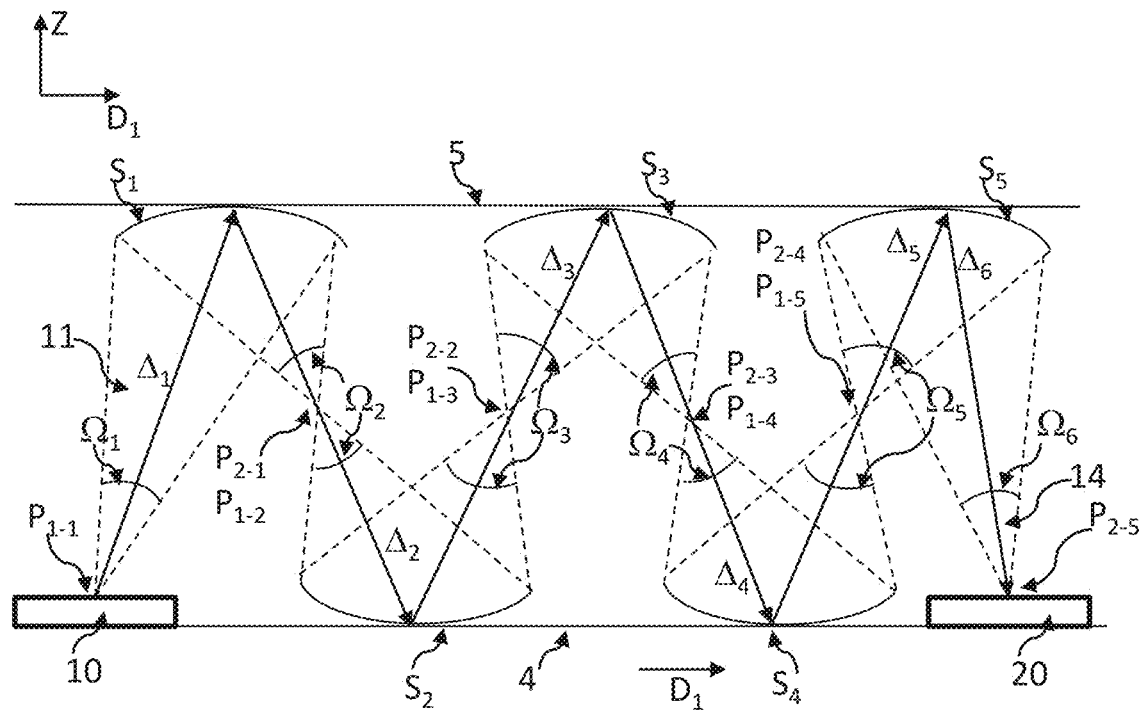
FIG. 2A schematically shows the first and second walls of the sensor and shows the positions of the main components of the sensor, i.e., a light source, a measuring photodetector and reflective surfaces. In this figure, the axis $D_1$ corresponds to a circular generatrix shown in FIG. 1B. This representation amounts to unrolling the enclosure of the sensor along this generatrix.

FIG. 2A schematically shows the interior of the enclosure 2. In FIG. 2A, the interior of the enclosure 2 along a circular generatrix $D_1$, which has been represented by a dashed line in FIG. 1B, has been shown. This representation amounts to unrolling the enclosure along the circular generatrix $D_1$, along which lie the ellipsoidal reflective surfaces $S_n$ of rank n. The index n is a natural integer such that $1 \leq n \leq N$, N being the number of ellipsoidal reflective surfaces located on the optical path of the light wave emitted by the light source 10 and propagating towards the measuring photodetector 20.

The term ellipsoidal surface $S_n$ designates an ellipsoidal surface of revolution, obtained by rotating in space an ellipse $E_n$ about one of its axes. In the described example, each ellipsoidal surface $S_n$ is associated with one ellipse $E_n$ having a major axis $a_n$ and a minor axis $b_n$. By ellipsoidal surface associated with an ellipse, what is meant is an ellipsoidal surface formed by rotating the ellipse about one of its axes. In the example shown, each ellipsoidal surface $S_n$ is obtained by rotating an ellipse $E_n$ with which it is associated about its major axis $a_n$. Such an ellipsoidal surface is said to be prolate.

By reflective surface, what is meant is a surface the reflection coefficient of which, in all or some of the emission spectral band $\Delta\lambda$, is higher than 50%, and preferably higher than 80%. In the infrared spectral domain, a reflective wall may be formed using a reflective material such as a metal, gold for example.

Each ellipsoidal reflective surface $S_n$ has a first focal point P1-$n$ and a second focal point P2-$n$, the two focal points being distinct from each other. When 1<n<N, the first focal point P1-$n$ is coincident with the second focal point P2-($n$−1) of a preceding surface $S_{n-1}$. The second focal point P2-$n$ is coincident with the first focal point P1-($n$−1) of a following surface $S_{n+1}$. When n=1 (first reflective surface $S_1$), the second focal point P2-1 is coincident with the first focal point P1-2 of the second reflective surface $S_2$. When n=N (last surface) the first focal point P1-N is coincident with the second focal point P2-(N−1) of the proceeding surface $S_{N-1}$. The first surface $S_1$ allows the incident light wave 11 emitted by the light source 10 to be reflected, whereas the last surface $S_N$ allows the light wave having passed through the enclosure 2 to be reflected towards the measuring photodetector 20. In the embodiment shown in FIGS. 2A and 3A to 3D, N=5. N may be comprised between 3 and 10, but the applicant considers N=5 to correspond to an optimum.

The light wave 11 emitted by the light source is successively reflected by the various surfaces $S_n$, according to their respective ranks, considered in increasing order. In other words, the reflective surfaces $S_1 \ldots S_N$ lie successively between the light source 10 and the measuring photodetector 20. The term lies successively is to be interpreted with respect to the propagation of light between the light source 10 and the measuring photodetector 20. The path of the light wave, projected onto the first wall 4 or the second wall 5, describes a circular arc.

Given dimensional constraints relating to the compactness of the sensor, it is preferable for the first ellipse $E_1$, associated with the first surface $S_1$, to have an eccentricity lower than 0.8, or even than 0.7 or than 0.5. By eccentricity of an ellipse having a major axis g, and a minor axis p, what is meant is the ratio:

$$e = \frac{\sqrt{g^2 - p^2}}{g} \quad (3)$$

The eccentricity of an ellipse is strictly comprised between 0 and 1, an eccentricity of zero corresponding to a circle.

The light source 10 is configured to emit the emission light wave 11 in such a way as to form a cone of light $\Omega_1$, called the first cone, that extends about a first axis $\Delta_1$, towards the first reflective surface $S_1$. The light source 10 is placed at a vertex of the first cone of light $\Omega_1$. The light source 10 is preferably coincident with the first focal point P1-1 of the first reflective surface $S_1$.

The term coincident is to be interpreted with a certain tolerance, and may mean "to be located in the vicinity of," the vicinity corresponding to a region lying a small distance from a point. By small distance, what is meant is a distance smaller than 1 mm, or even smaller than 0.5 mm.

The first reflective surface $S_1$ is configured to reflect the first cone of light $\Omega_1$ to form a second cone of light $\Omega_2$, extending about a second axis $\Delta_2$. The second cone of light converges towards the second focal point P2-1 of the first reflective surface $S_1$, the latter focal point corresponding to the first focal point P1-2 of the second reflective surface $S_2$. Downstream of the first focal point P1-2, the second cone of light $\Omega_2$ diverges up to the second reflective surface $S_2$.

The second reflective surface $S_2$ is configured to reflect the second cone of light $\Omega_2$ to form a third cone of light $\Omega_3$, extending about a third axis $\Delta_3$. The third cone of light $\Omega_3$ converges towards the second focal point P2-2 of the second reflective surface $S_2$, the latter focal point corresponding to the first focal point P1-3 of the third reflective surface $S_3$. Downstream of the first focal point P1-3, the third cone of light $\Omega_3$ diverges up to the third reflective surface $S_3$.

The third reflective surface $S_3$ is configured to reflect the third cone of light $\Omega_3$ to form a fourth cone of light $\Omega_4$, extending about a fourth axis $\Delta_4$. The fourth cone of light $\Omega_4$ converges towards the second focal point P2-3 of the third reflective surface $S_3$, the latter focal point corresponding to the first focal point P1-4 of the fourth reflective surface $S_4$. Downstream of the first focal point P1-4, the fourth cone of light $\Omega_4$ diverges up to the fourth reflective surface $S_4$.

The fourth reflective surface $S_4$ is configured to reflect the fourth cone of light $\Omega_4$ to form a fifth cone of light $\Omega_5$, extending about a fifth axis $\Delta_5$. The fifth cone of light $\Omega_5$ converges towards the second focal point P2-4 of the fourth reflective surface $S_4$, the latter focal point corresponding to the first focal point P1-5 of the fifth reflective surface $S_5$. Downstream of the first focal point P1-5, the fifth cone of light $\Omega_5$ diverges up to the fifth reflective surface $S_5$.

The fifth reflective surface $S_5$ is configured to reflect the fifth cone of light $\Omega_5$ to form a sixth cone of light $\Omega_6$, extending about a sixth axis $\Delta_6$. The sixth cone of light $\Omega_6$ converges towards the second focal point P2-5 of the fifth reflective surface $S_5$. The measuring photodetector 20 is placed in the cone of light $\Omega_6$, upstream or downstream of the second focal point P2-5 or at the second focal point P2-5.

Thus, the light wave 11 emitted by the light source 10 propagates between the various reflective surfaces $S_1 \ldots S_N$ with, in this example, N=5. Between two successive surfaces $S_n$, $S_{n+1}$, the light wave forms a cone $\Omega_{n+1}$ that converges from the surface $S_n$ towards the second focal point P2-$n$ of the surface $S_n$, which forms the apex of the cone $\Omega_{n+1}$, and which is coincident with the first focal point P1-$n$+1 of the surface $S_{n+1}$. Downstream of the latter focal point, the cone $\Omega_{n+1}$ diverges up to the surface of rank n+1.

Thus, the light wave propagates directly from an ellipsoidal reflective surface $S_n$ of rank n to an ellipsoidal reflective surface $S_{n+1}$ of rank n+1. By directly, what is meant is without undergoing a reflection from another surface between the two ellipsoidal reflective surfaces. Thus, between the light source 10 and the measuring photodetector 20, the light wave emitted by the light source undergoes N reflections, i.e., as many reflections as there are ellipsoidal surfaces placed between the light source and the measuring photodetector. This allows losses of signal on each reflection to be minimized.

Advantageously, as shown in FIG. 2A, the light source 10 and the measuring photodetector 20 are borne by the same wall, which in this example is the first wall 4. The ellipsoidal reflective surfaces $S_n$ of even rank n are borne by the same wall. The ellipsoidal reflective surfaces $S_n$ of uneven rank n are borne by the wall opposite the wall bearing the light source 10 and the measuring photodetector 20. The opposite wall is in this example the second wall 5. Using an uneven number N of reflective surfaces, the sensor is such that the light source 10 may be placed in a coplanar manner, or substantially coplanar manner, with the measuring photodetector 20.

Figure 2B:
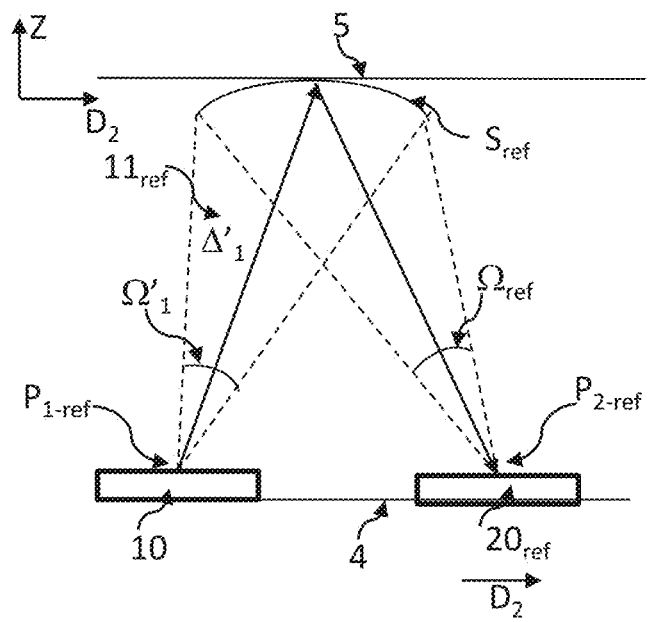
FIG. 2B schematically shows the first and second walls of the sensor. In this figure, the axis $D_2$ corresponds to a circular generatrix shown in FIG. 1B. This representation amounts to unrolling the enclosure of the sensor along this generatrix.

When the sensor 1 comprises a reference photodetector $20_{ref}$, the latter may be placed on the same wall as the light source 10. In this case, a reference ellipsoidal reflective surface $S_{ref}$ is placed on the opposite wall, as shown in FIG. 2-B. The reference reflective surface is associated with an ellipse $E_{ref}$. In FIG. 2B, the interior of the enclosure 2 along a circular generatrix $D_2$, which has been represented by a dot-dashed line in FIG. 1B, has been shown. This representation amounts to unrolling the enclosure 2 along the circular generatrix $D_2$. The reflective surface $S_{ref}$ has a first focal point $P_{1-ref}$ and a second focal point $P_{2-ref}$, the focal points being distinct from each other. The light source 10 generates an auxiliary cone of light $\Omega'_1$, which extends between the light source 10 and the reference reflective surface $S_{ref}$. The latter reflects the auxiliary cone $\Omega'_1$ to form a reference cone $\Omega_{ref}$ that converges in the direction of the reference photodetector $20_{ref}$. The light source 10 is placed at the first focal point $P_{1-ref}$ of the reference surface $S_{ref}$. The reference photodetector $20_{ref}$ is placed in the reference cone $\Omega_{ref}$, upstream or downstream of the second focal point $P_{2-ref}$ or at the second focal point $P_{2-ref}$. Just like the reflective surfaces of uneven rank, the reference reflective surface is preferably borne by the wall opposite that bearing the light source, the measuring photodetector 20 and the reference photodetector $20_{ref}$.

FIGS. 3A to 3D show the arrangement of the various reference ellipsoidal surfaces in one example of implementation of embodiments of the disclosure. FIGS. 3A to 3D were obtained by gradually turning a three-dimensional model of the sensor in the positive direction of rotation shown in FIG. 1B.

Figure 3A:
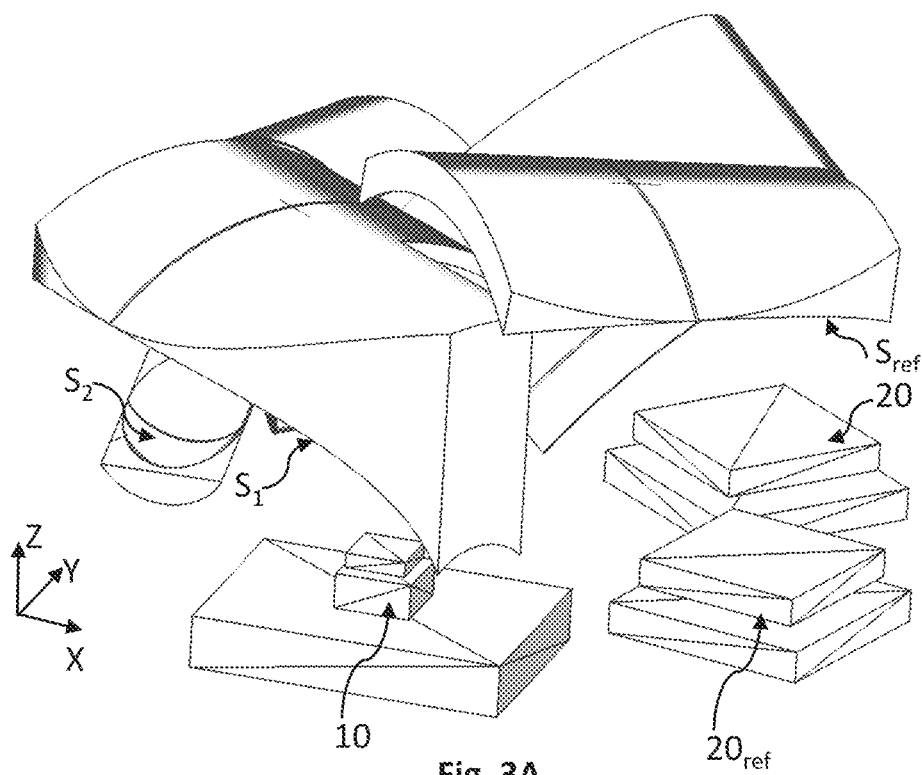
FIGS. 3A, 3B, 3C and 3D show the main components of the sensor. Between the various figures, the point of view rotates about the sensor in a positive direction of rotation shown in FIG. 1B.
Figure 3B:
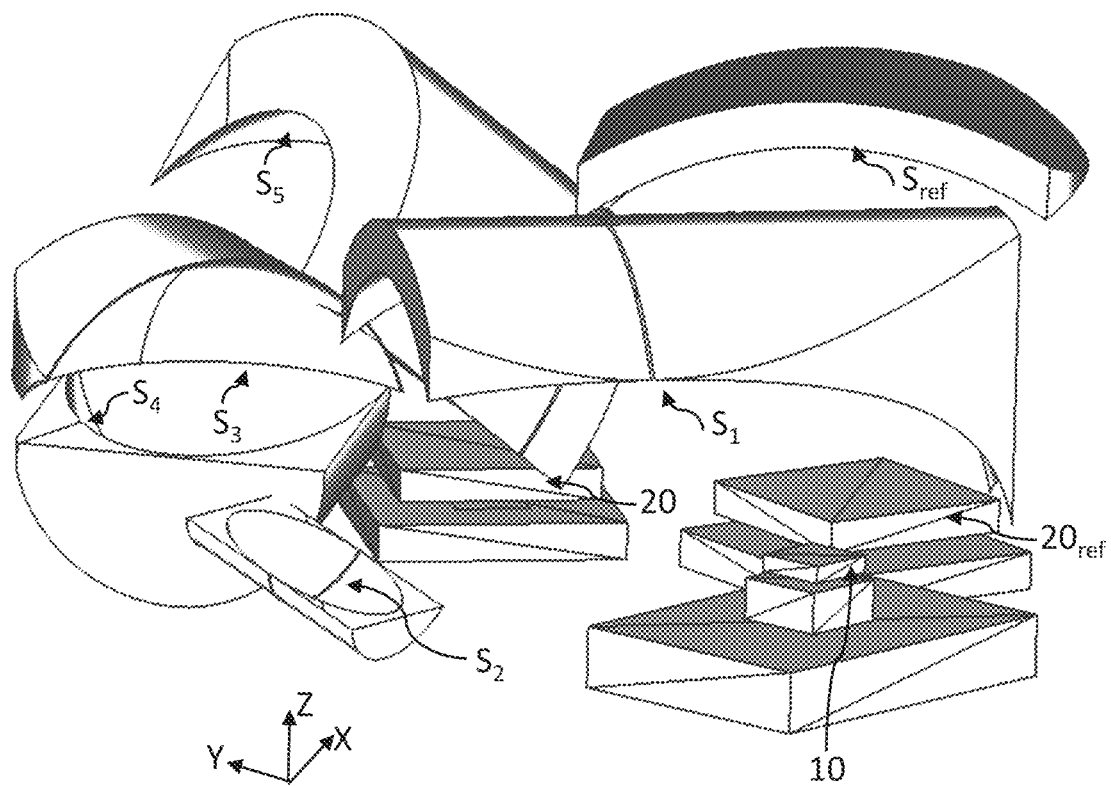

In FIG. 3A, the light source 10, the reference photodetector $20_{ref}$ and the reference reflective surface $S_{ref}$ may be seen. The first and second reflective surfaces $S_1$ and $S_2$ may also be seen. In FIG. 3B, apart from the elements mentioned with reference to FIG. 3A, the third, fourth and fifth reflective surfaces may be seen.

In this embodiment, each reflective surface is arranged on an internal face of a first or second wall: the reflective surfaces of even rank are integrated into the internal face $4_i$ of the first wall 4, whereas the reflective surfaces of uneven rank are integrated into the internal face $5_i$ of the second wall 5. The integration of the reflective surfaces of ellipsoidal-of-revolution shape into each internal face may be obtained using moulding or machining manufacturing techniques. Moulding is a preferred option, because after the moulds have been formed, it is simple to implement, repetitive and less expensive. According to this embodiment, the enclosure 2 may be formed by simply assembling the first wall 4 against the second wall 5, the sidewall 6 being integrated either into the first wall 4, into the second wall 5, or partially into both walls.

Figure 3C:
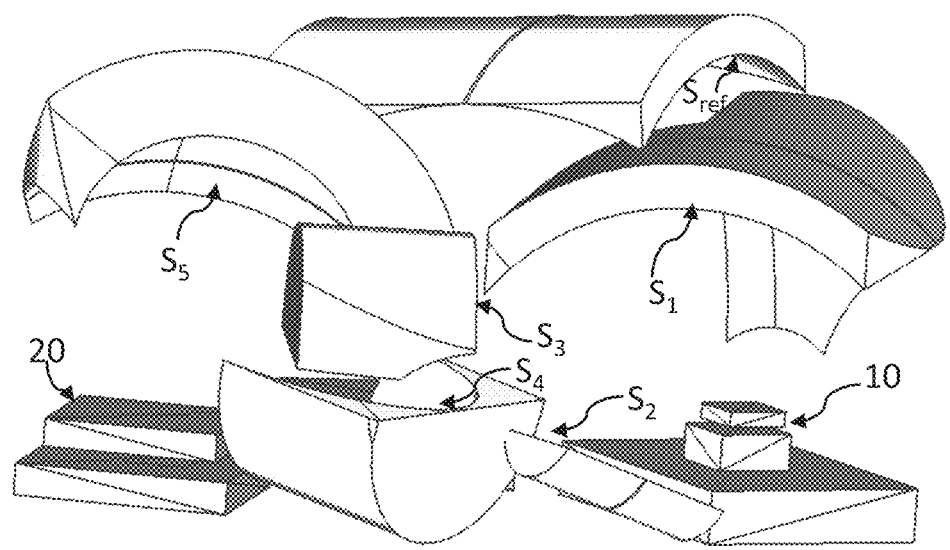
Figure 3D:
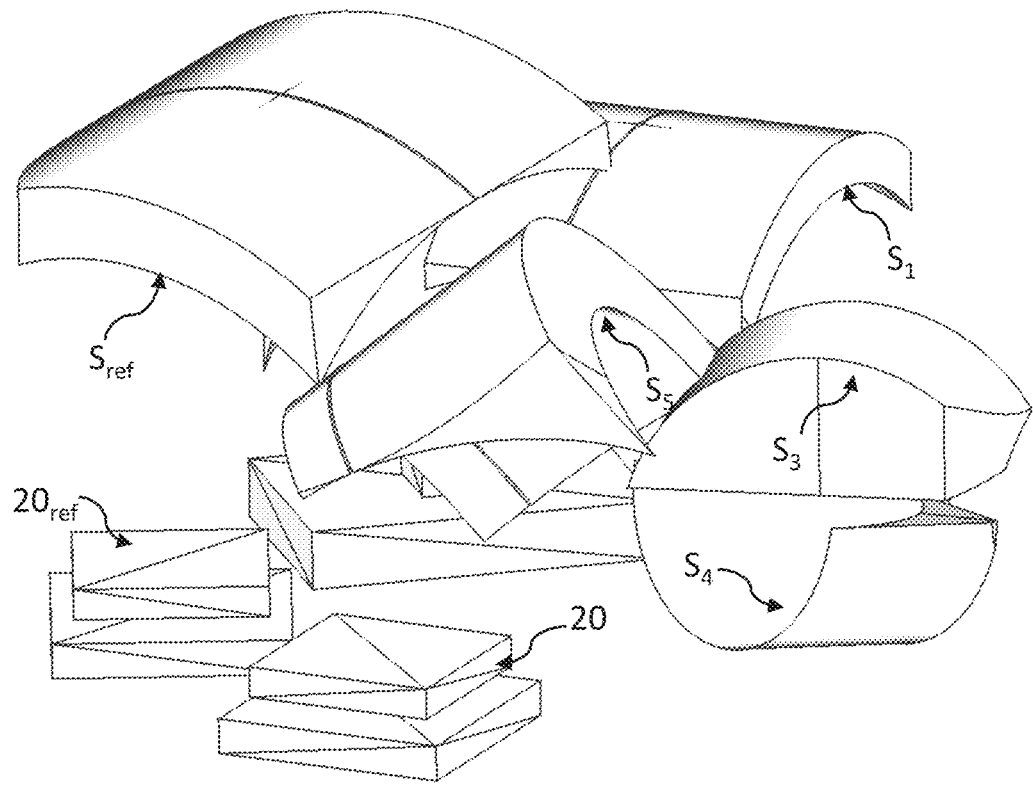

FIGS. 3C and 3D show other details of the reflective surfaces described above.

Table 1, below, collates the coordinates of the centres of the light source 10, of the photodetector 20 and of the reference photodetector $20_{ref}$. The centre of the source 10 is considered to be the origin of the coordinate system. The angle of orientation with respect to the axis Z has also been indicated. Table 1 also presents the main characteristic coordinates of the ellipsoids of revolution forming each reflective surface. For each ellipsoid, the coordinates of the centre, corresponding to the intersection of the major axis a and of the minor axis b of the ellipse associated with each ellipsoidal surface, along the axes X, Y and Z, have been given. The angles of inclination $\theta_x$, $\theta_y$ and $\theta_z$ of the major axis a with respect to the axes X, Y and Z have also been given. The dimensions of the major axis a and of the minor axis b have also been given. Regarding the angles, the unit is degrees. Regarding the coordinates or dimensions, the unit is millimetres.

TABLE 1

|  | X | Y | Z | $\theta_X$ | $\theta_Y$ | $\theta_Z$ | a | b |
|---|---|---|---|---|---|---|---|---|
| 10 | 0.0 | 0.0 | 0 | 0 | 0 | 0 | | |
| $20_{ref}$ | 5.6 | 4.4 | −1.3 | 0 | 0 | 76.4 | | |
| $E_{ref}$ | 2.8 | 2.2 | −0.3 | 90 | 38.2 | −7.3 | 8.1 | 7.3 |
| 20 | 3.7 | 10.1 | −1.3 | 0 | 0 | 140.3 | | |
| $E_1$ | −2.8 | 2.1 | 0.0 | 90 | −37.5 | 0 | 6.7 | 5.7 |
| $E_2$ | −5.6 | 5.5 | 0.5 | 90 | 92.5 | 20 | 1.8 | 1.2 |
| $E_3$ | −5.0 | 8.1 | 0.9 | 90 | 65 | 0 | 3.7 | 3.4 |
| $E_4$ | −2.2 | 10.4 | 1.7 | 90 | 25 | 10 | 3.6 | 2.6 |
| $E_5$ | 1.8 | 10.8 | 0.6 | 90 | −19.9 | −38.4 | 5.2 | 4.5 |

The inclination of the respective major axes of each ellipse, from which each ellipsoid is formed, is therefore variable, in particular with respect to the transverse axis Z.

Figure 4A:
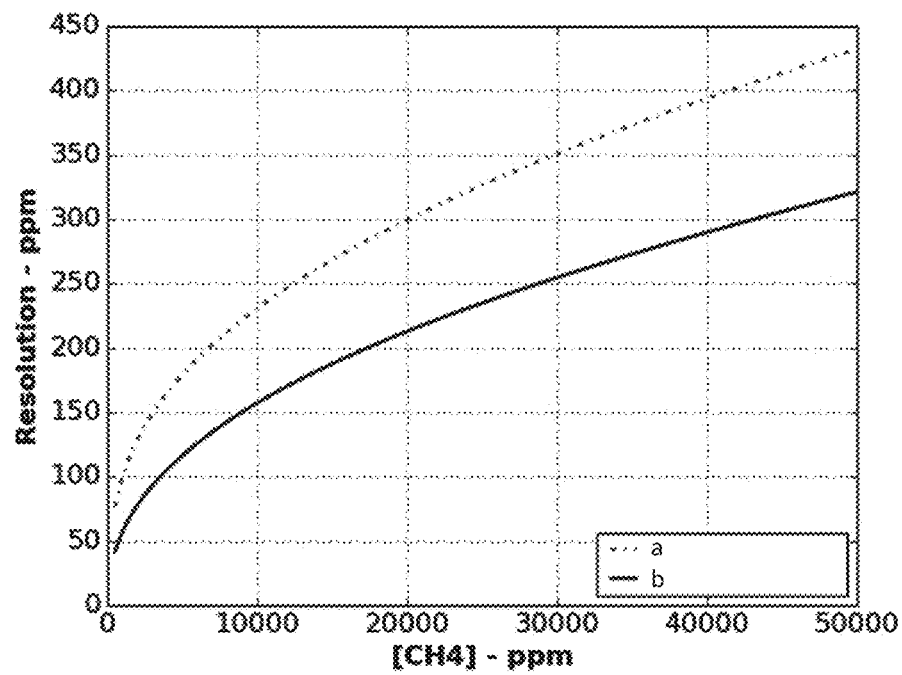
FIGS. 4A and 4B are results of modelling allowing the performance of the sensor to be estimated, with respect to detection of methane and of carbon dioxide, respectively.
Figure 4B:
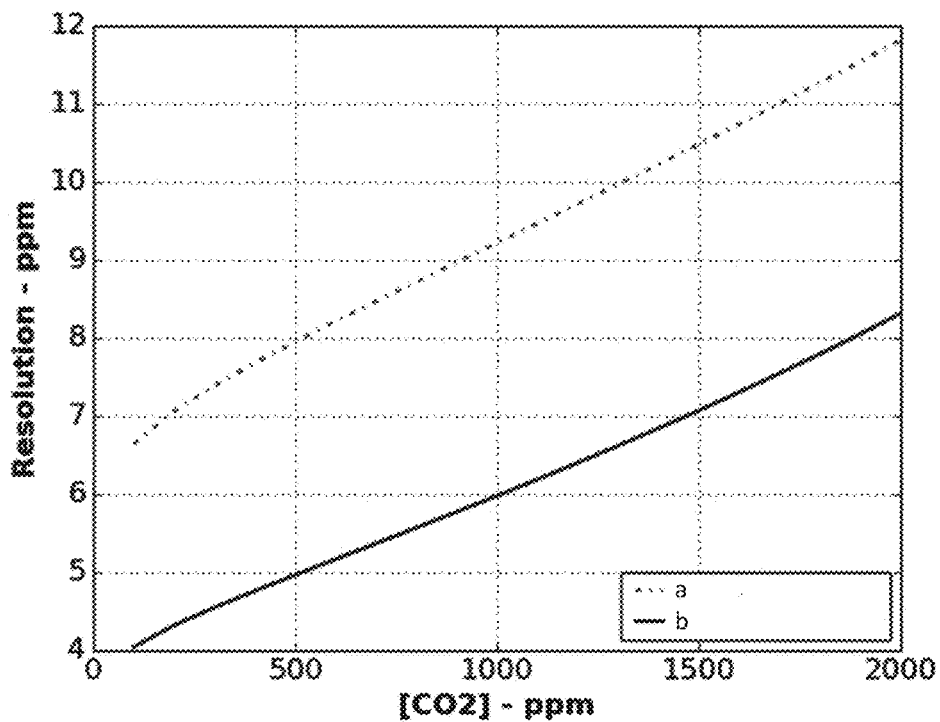

Simulations have been performed in order to estimate the performance of the configuration described above. The detectable variations in the concentration of a gaseous species as a function of the concentration of said gaseous species in the gas occupying the enclosure 2 have been estimated. FIG. 4A shows the results obtained from methane ($CH_4$). The x-axis shows the concentration of $CH_4$ in the enclosure, whereas the y-axis shows the detectable variations in the concentration of $CH_4$. FIG. 4A further shows estimations made considering the gas sensors described in WO2018162848 (curve a) and according to embodiments of the disclosure (curve b), respectively. FIG. 4B is a figure analogous to FIG. 4A, the gaseous species in question being $CO_2$. It may be seen that in both cases the gas sensor according to embodiments of the disclosure allows a lower gas concentration to be estimated than the sensor according to the prior art.

Embodiments of the disclosure will possibly be applied to gas detection for environmental-monitoring purposes, or used in applications involving the inspection of industrial gases, notably in the food-processing industry, in the petroleum industry, or in the distribution of gas.

The invention claimed is:

1. A Gas sensor comprising an enclosure configured to receive a gas, the enclosure comprising a sidewall that extends, about a transverse axis, between a first wall and a second wall, the sensor also comprising:
   a light source configured to emit a light wave that propagates through the enclosure and forms, from the light source, a first light cone; and
   a measuring photodetector configured to detect a light wave emitted by the light source and propagating through the enclosure;
   the sensor being such that the first wall and the second wall each comprise at least one reflective surface, forming a portion of an ellipsoid of revolution, with each reflective surface being associated with a rank n, n being an integer higher than or equal to 1, such that the sensor comprises:
- a first reflective surface of rank 1, having a first focal point and a second focal point, the first reflective surface being placed facing the light source, the first reflective surface forming a portion of an ellipsoid of revolution associated with an ellipse the eccentricity of which is lower than or equal to 0.7; and
- at least one reflective surface of rank n strictly higher than 1, each reflective surface of rank n having:
    - a first focal point, coincident with the second focal point of a reflective surface of preceding rank n−1;
    - a second focal point, distinct from the first focal point and coincident with the first focal point of a reflective surface of following rank n+1; and
- a last reflective surface of rank N, comprising a first focal point coincident with the second focal point of a reflective surface of preceding rank, the last reflective surface also comprising a second focal point;
- such that the light wave emitted by the light source is successively reflected by the N ellipsoidal-of-revolution reflective surfaces, according to their respective rank, before converging towards the second focal point of the last reflective surface in such a way as to form a last light cone, the measuring photodetector being placed so as to lie in the last light cone.

2. The sensor according to claim 1, wherein the light source is placed at the first focal point of the first reflective surface, or at a distance smaller than 1 mm from the latter.

3. The sensor according to claim 1, wherein the measuring photodetector is placed at the second focal point of the last reflective surface, or at a distance smaller than 1 mm from the latter.

4. The sensor according to claim 1, wherein:
- each reflective surface of rank n is configured to reflect the light wave that it receives in such a way as to form a light cone of rank n+1, the latter extending about a propagation axis of rank n+1;
- when n<N, the propagation axis of rank n+1 extends from the surface of rank n to the surface of rank n+1 and through the second focal point of the surface of rank n, the latter being coincident with the first focal point of the surface of rank n+1; and
- when n=N, the propagation axis of rank N+1 extends from the surface of rank N to the measuring photodetector;
- in such a way that the light wave emitted by the light source undergoes a number of reflections corresponding to the number of reflective surfaces before reaching the measuring photodetector.

5. The sensor according to claim 4, wherein, when n<N, each light cone of rank n+1 converges towards the second focal point of the surface of rank n from which it is propagating, then diverges towards the surface of rank n+1 towards which it is propagating.

6. The sensor according to claim 1, wherein the light source and the photodetector are integral with an internal face of the first wall, the internal face being oriented towards the interior of the enclosure.

7. The sensor according to claim 6, wherein:
reflective surfaces of even rank are arranged on the internal face of the first wall; and
reflective surfaces of uneven rank are arranged on an internal face of the second wall.

8. The sensor according to claim 7, wherein the enclosure is formed by assembling the first wall facing the second wall.

9. The sensor according to claim 1, wherein the number of reflective surfaces lying between the light source and the measuring photodetector is uneven.

10. The sensor according to claim 9, wherein the number of reflective surfaces lying between the light source and the measuring photodetector is equal to 5.

11. The sensor according to claim 1, comprising a reference photodetector configured to detect a light wave considered not to be attenuated by the gas.

12. The sensor according to claim 11, comprising a reference reflective surface, forming an ellipsoid of revolution, the reference surface comprising:
a first focal point placed at the light source, or at a distance smaller than 1 mm from the latter; and
a second focal point placed at the measuring photodetector, or at a distance smaller than 1 mm from the latter.

13. A Method for analysing a gas using a sensor according to claim 1, the method comprising the following steps:
a) introducing the gas into the enclosure of the sensor;
b) illuminating the gas using the light source;
c) measuring, with the measuring photodetector, a light intensity of a light wave emitted by the light source and having propagated through the enclosure; and
d) determining an amount of a gaseous species in the gas, on the basis of the measured light intensity.

14. The method according to claim 13, wherein step d) is implemented by a processing unit on the basis of a signal generated by the measuring photodetector.

* * * * *

UNITED STATES PATENT AND TRADEMARK OFFICE
CERTIFICATE OF CORRECTION

PATENT NO. : 11,921,031 B2
APPLICATION NO. : 17/594630
DATED : March 5, 2024
INVENTOR(S) : Hélène Duprez It is certified that error appears in the above-identified patent and that said Letters Patent is hereby corrected as shown below:

In the Specification

| | | |
|---|---|---|
| Column 2, | Line 49, | change "cone of light:" to --cone of light.-- |
| Column 3, | Line 9, | change "rank it from" to --rank n from-- |
| Column 3, | Line 32, | change "light source; or at" to --light source, or at-- |
| Column 7, | Line 23, | change "point P1-($n$-1) of a" to --point P1-($n$+1) of a-- |
| Column 7, | Line 50, | change "axis g, and a minor" to --axis g and a minor-- |
| Column 9, | Lines 13-14, | change "in FIG. 2-B. The" to --in FIG. 2B. The-- |

In the Claims

| | | | |
|---|---|---|---|
| Claim 1, | Column 11, | Line 13, | change "rank n-1;" to --rank n-1; and-- |
| Claim 1, | Column 11, | Line 16, | change "rank n+1; and" to --rank n+1;-- |

Signed and Sealed this
Tenth Day of December, 2024

Katherine Kelly Vidal
*Director of the United States Patent and Trademark Office*